United States Patent [19]

Lenzen

[11] Patent Number: 5,005,486

[45] Date of Patent: Apr. 9, 1991

[54] IGNITER FOR AIRBAG PROPELLANT GRAINS

[75] Inventor: Reiner Lenzen, Almont, Mich.

[73] Assignee: TRW Vehicle Safety Systems Inc., Lyndhurst, Ohio

[21] Appl. No.: 306,877

[22] Filed: Feb. 3, 1989

[51] Int. Cl.$^5$ .............................................. C06D 5/00
[52] U.S. Cl. .................................. 102/531; 102/202.5
[58] Field of Search ................... 102/470, 202, 202.5, 102/205, 530, 531

[56] References Cited

U.S. PATENT DOCUMENTS

| | | | |
|---|---|---|---|
| 2,064,503 | 12/1936 | Temple | 102/531 |
| 2,424,993 | 8/1947 | Meister | 102/202 |
| 2,485,601 | 10/1949 | Hickman | 102/531 |
| 2,934,014 | 4/1960 | Smith et al. | 102/202 |
| 2,954,947 | 10/1960 | Zabelka et al. | 102/531 |
| 2,995,088 | 8/1961 | Asplund | 102/202 |
| 3,003,419 | 10/1961 | Fite | 102/202 |
| 3,011,441 | 12/1961 | Gordon | 102/202 |
| 3,435,765 | 4/1969 | Gawlick | 102/531 |
| 3,641,935 | 2/1972 | Gawlick et al. | 102/531 |
| 3,904,221 | 9/1975 | Shiki et al. | 102/531 |
| 4,648,319 | 3/1987 | Westerlund et al. | 102/202.5 |
| 4,696,705 | 9/1987 | Hamilton | 149/21 |
| 4,698,107 | 10/1987 | Goetz et al. | 149/7 |
| 4,817,828 | 4/1989 | Goetz | 222/3 |

FOREIGN PATENT DOCUMENTS

| | | | |
|---|---|---|---|
| 1069134 | 7/1954 | France | 102/470 |
| 2343987 | 10/1977 | France | 102/470 |
| 266396 | 4/1950 | Switzerland | 102/530 |

Primary Examiner—Deborah L. Kyle
Assistant Examiner—Stephen Johnson
Attorney, Agent, or Firm—Tarolli, Sundheim & Covell

[57] ABSTRACT

An apparatus for igniting a gas generating propellant grain which is susceptible to shattering when suddenly exposed to pressure above a predetermined pressure. The apparatus comprises a housing having a peripheral side surface, an axial end surface and a longitudinal central axis. An ignitable material is contained in the housing. The ignitable material develops hot gases, flame and pressure within said housing upon combustion of the ignitable material. The peripheral side surface of the housing ruptures at a pressure which is substantially less than the predetermined pressure at which the propellant grain shatters to direct the hot gases and flame radially of the longitudinal central axis of the housing to ignite the propellant grain.

28 Claims, 2 Drawing Sheets

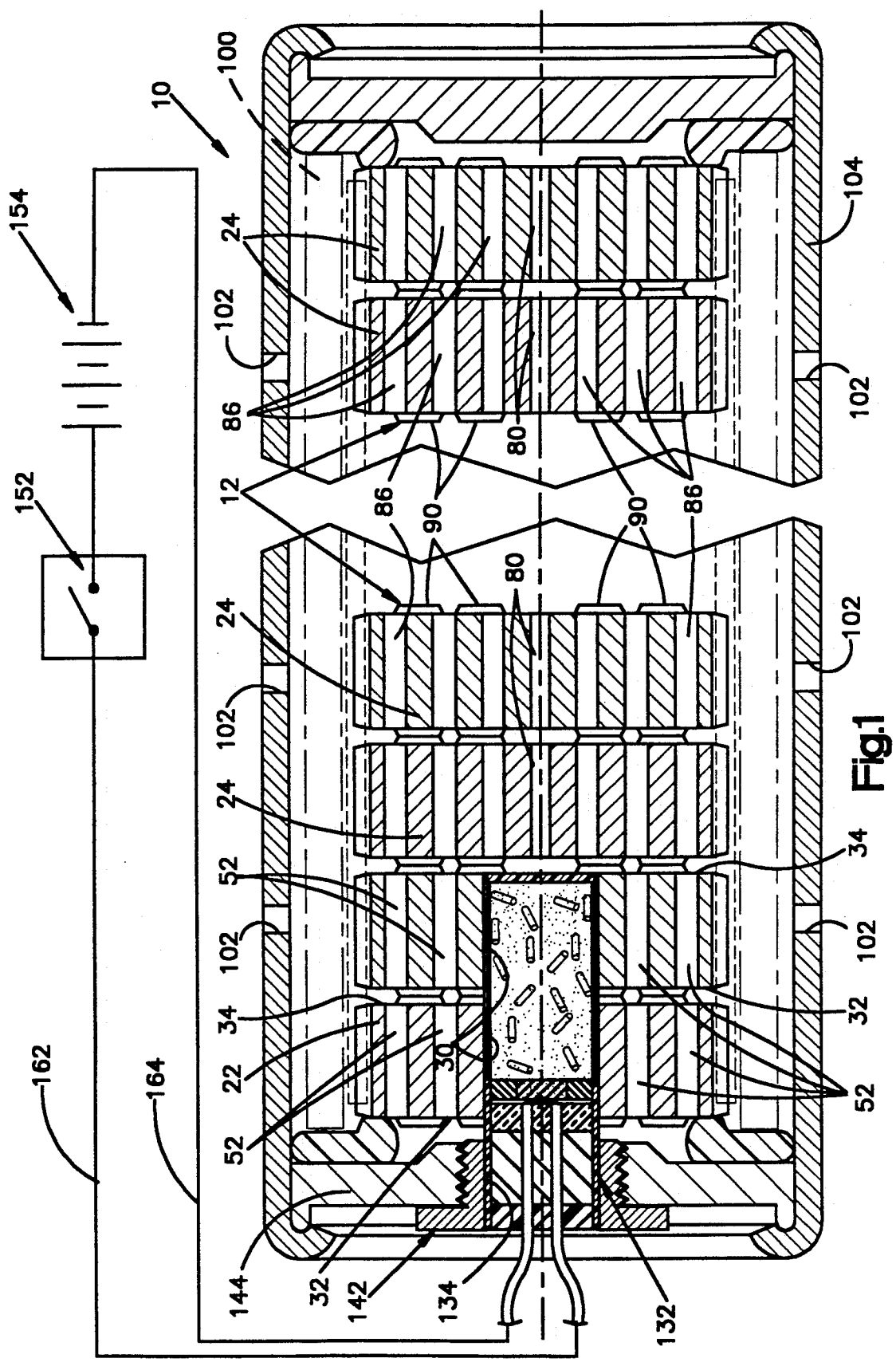

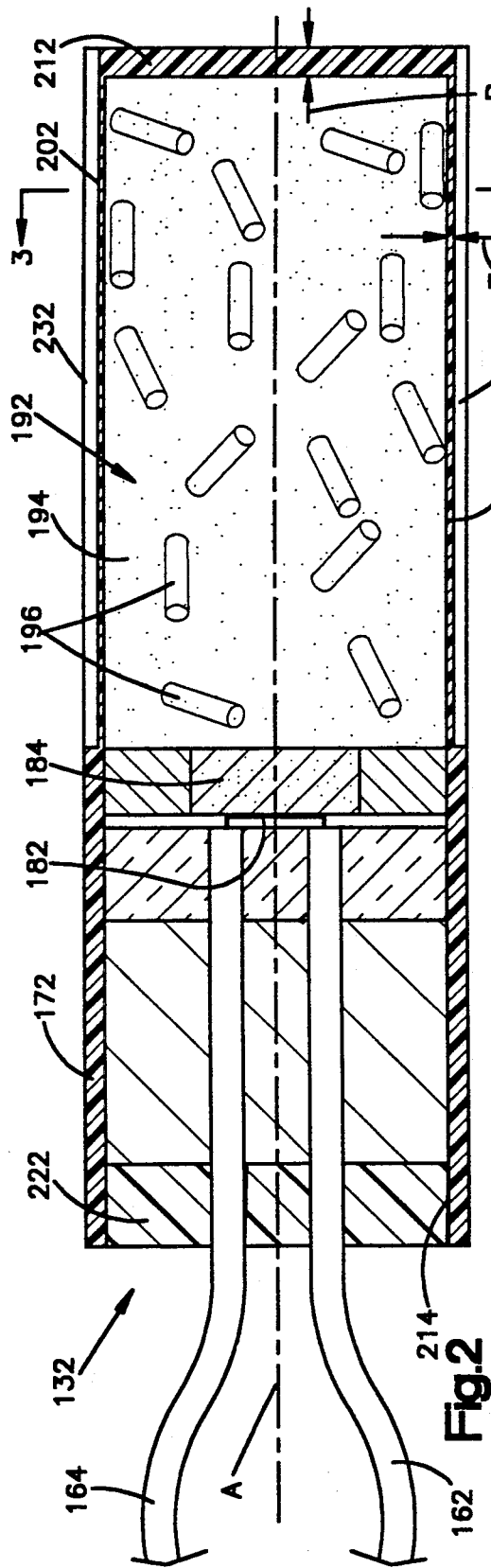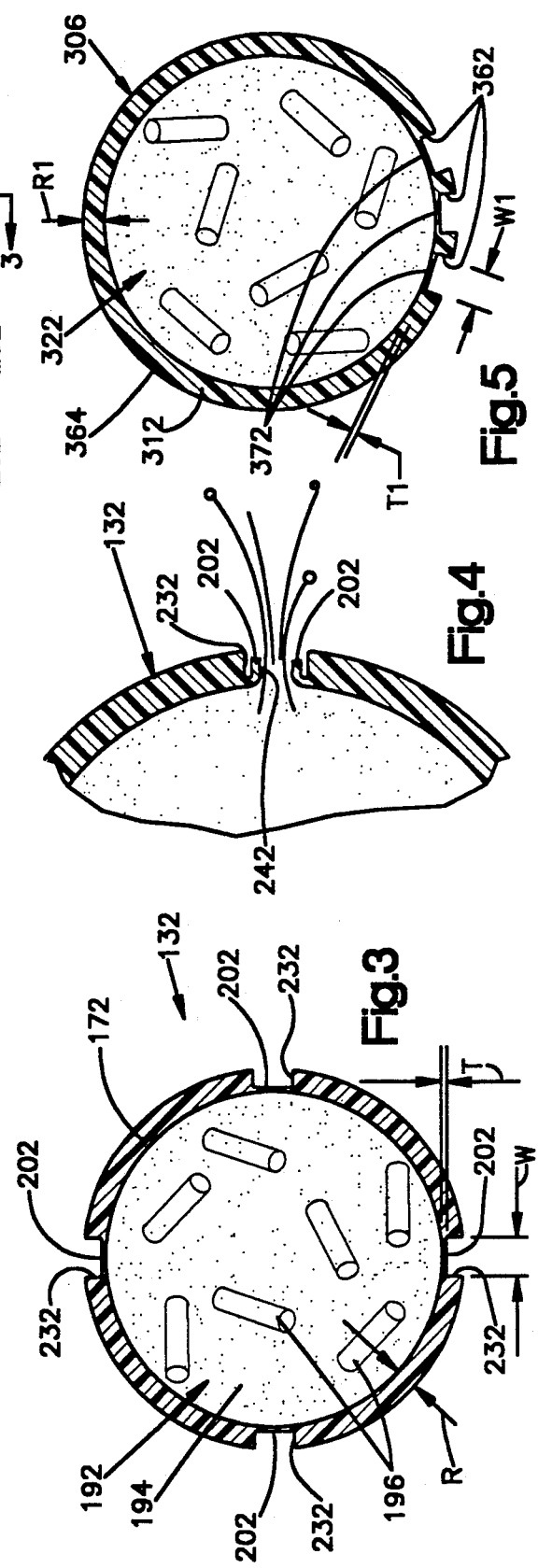

IGNITER FOR AIRBAG PROPELLANT GRAINS

BACKGROUND OF THE INVENTION

1. Technical Field

The present invention relates to a vehicle airbag system and, particularly, relates to an igniter for igniting gas generating propellant grains in an inflator of the airbag system.

2. Description of the Prior Art

Igniters for igniting gas generating propellant grains in inflators for vehicle airbag systems are known. One such known igniter includes a metal housing and an ignitable material contained within the housing. During combustion of the ignitable material, hot gases, flame and pressure are generated within the housing. When the pressure within the housing increases to approximately 1500 psi, the housing ruptures and the hot gases and flame escape under pressure.

When the igniter is used in an inflator having a plurality of nitrogen gas generating propellant grains with an ignition enhancing coating, such as the propellant grains disclosed in U.S. Pat. No. 4,698,107, the igniter is located coaxially of and within axially extending openings in the end propellant grains. The ignitable material in the igniter is typically ignited at one axial end of the igniter housing and burns toward the other axial end of the igniter housing which is weakened by scribe lines. The weakened areas rupture and the hot gases and flame flow axially from the igniter and strike an adjacent end surface of another propellant grain.

When the propellant grain is suddenly impacted by the hot gases and flame, the propellant grain may shatter or the ignition enhancing coating may detonate and shatter one or more of the propellant grains. A shattered propellant grain has a greater surface area than an undamaged propellant grain. The greater surface area of a shattered propellant grain accelerates combustion of the propellant grains and causes a larger volume of gas to be generated in a shorter period of time. Furthermore, the propellant grains often shatter in a manner that is not repeatable from grain to grain. Thus, shattered propellant grains may detrimentally affect the performance of the inflator. The propensity of the igniter to shatter the propellant grain because of suddenly exposing the propellant grain and/or the coating to the pressure is referred to as "brisance".

U.S. Pat. No. 2,934,014 and U.S. Pat. No. 3,011,441 recognize the problem of brisance when pressure from an igniter shatters gas generating propellant grains in a rocket motor. The igniters disclosed in U.S. Patents No. 2,934,014 and U.S. Pat. No. 3,011,441 address the brisance problem by igniting the ignitable material in an igniter housing at one axial end. The ignitable material then burns toward a closed end of the igniter housing. A pressure wave front caused by combustion of the ignitable material reflects off the closed end of the igniter housing. The reflected pressure wave then exits the igniter through a ruptured open end of the igniter housing adjacent a location at which ignition of the ignitable material started. Reflecting the pressure wave dissipates some of the energy generated by combustion of the ignitable material. The impact of the pressure wave against the propellant grain is, thus, reduced to a level which can be tolerated by the propellant grain to minimize shattering.

SUMMARY OF THE INVENTION

The present invention is directed to an igniter for igniting a gas generating propellant grain in a vehicle airbag inflator. The propellant grain is susceptible to shattering when suddenly exposed to pressure above a predetermined pressure. The propellant grain also has an ignition enhancing coating which may detonate when suddenly exposed to pressure above a predetermined pressure. The igniter embodying the present invention comprises a housing and an ignitable material contained within the housing. Upon combustion of the ignitable material, hot gases, flame and pressure develop within the housing. The housing includes a weakened area. The weakened area ruptures when the pressure within the housing reaches a pressure which is substantially less than the predetermined pressure at which the propellant grain shatters and/or the coating detonates. After the weakened area ruptures, the hot gases and flame are directed toward a relatively large surface area of the propellant grain to ignite the coating on the propellant grain. The weakened area preferably ruptures in response to the pressure within the housing increasing to a pressure less than 800 psi. Thus, the igniter embodying the present invention does not suddenly expose the propellant grains to a relatively high pressure at which the propellant grains may shatter or at which the coating may detonate.

The housing of the igniter is cylindrical, elongate and made of metal. The weakened area comprises at least one longitudinally extending groove in the exterior surface of a peripheral side surface of the housing. The wall thickness of the housing measured radially inwardly of the groove is less than half the wall thickness of the remainder of the housing. The remainder of the housing preferably has a wall thickness of at least 0.010 of an inch. The wall thickness of the housing measured radially inwardly of the groove is preferably between 0.001 of an inch and 0.003 of an inch. When the housing ruptures, hot gases and flame are directed radially of the longitudinal central axis of the housing.

BRIEF DESCRIPTION OF THE DRAWINGS

Further features of the present invention will become apparent to those skilled in the art to which the present invention relates from reading the following specification with reference to the accompanying drawings, in which:

FIG. 1 is a longitudinal sectional view of an inflator for a vehicle airbag system including an igniter embodying the present invention;

FIG. 2 is an enlarged longitudinal sectional view of the igniter of FIG. 1;

FIG. 3 is a sectional view of the igniter of FIG. 2, taken along the line 3—3 in FIG. 2;

FIG. 4 is an enlarged view of a portion of the igniter of FIG. 3 with a ruptured weakened area; and FIG. 5 is a sectional view similar to FIG. 3 of an igniter according to another embodiment of the present invention.

DESCRIPTION OF PREFERRED EMBODIMENTS

The present invention is directed to an igniter for igniting gas generating propellant grains in an inflator for a vehicle airbag system. The structure of the airbag system may vary. By way of example, an inflator 10 for the vehicle airbag system is illustrated in FIG. 1.

When the vehicle is involved in a collision, an airbag (not shown) associated with the inflator 10 is expanded from a collapsed condition to an inflated condition by a rapid flow of gas from the inflator 10. Gas is generated by combustion of gas generating material 12 located in the inflator 10. The gas generating material 12 includes a plurality of cylindrically shaped gas generating propellant grains 22, 24 located within the inflator 10. Combustion of the propellant grains 22, 24 occurs quickly to generate a relatively large volume of gas which is directed into the airbag. The airbag preferably fully inflates in 20 to 40 milliseconds after the occurrence of an emergency situation such as a collision.

Each of the cylindrical propellant grains 22 has a relatively large diameter cylindrical central passage 30 extending between axially opposite end faces 32, 34 of each propellant grain. A plurality of additional cylindrical passages 52 extend through the propellant grains 22 between the axially opposite end faces 32, 34 to maximize the rate of combustion of the propellant grains 22. The axes of the passages 52 extend parallel to the longitudinal central axes of the propellant grains 22 and the central passages 30.

Each of the propellant grains 24 has a relatively small diameter cylindrical central passage 80 with a central axis coincident with the longitudinal central axis of the propellant grain 24. The passage 80 extends between opposite axial end faces 82, 84 of each propellant grain 24. In addition, each propellant grain 24 has a plurality of cylindrical passages 86 which extend axially through the grain 24 between the opposite end faces 82, 84. The central axes of the passages 86 extend parallel to the central axes of the passage 80 and the propellant grain 24. The passages 52, 80, 86 are circular, identical in diameter and uniform throughout their axial extent. The passages 52, 80, 86 are located to promote uniform combustion of the propellant grains 22, 24 as described in detail in co-pending application Ser. No. 915,266, filed Oct. 3, 1986, now U.S. Pat. No. 4,817,828 and assigned to the assignee of the present invention, the disclosure of which is fully incorporated herein by reference.

The gas which is generated within the various passages 30, 52, 80, 86 of the propellant grains 22, 24 flows from the passages to initiate burning of other propellant grains and/or other portions of the same propellant grains. To provide for such flow, spaces are provided between axial end faces of adjacent propellant grains 22, 24. The spaces at opposite axial ends of the propellant grains extend radially outwardly from the longitudinal central axes of the propellant grains. The spaces are provided by axially projecting standoff pads or projections 90 formed on the axially opposite end faces 32, 34, 82, 84 of the propellant grains 22, 24. The standoff pads 90 for one propellant grain 22, 24 engage the standoff pads 90 on the adjacent grain to provide spaces of equal width or axial extent between the adjacent grains. The propellant grains 22, 24 are preferably made of an alkali metal azide compound as disclosed in U.S. Pat. No. 4,696,705. The propellant grains 22, 24 are susceptible to shattering when suddenly exposed to pressure above a predetermined pressure of approximately 1,500 psi.

The propellant grains 22, 24 have an ignition enhancing coating applied to their exterior surfaces. Generally, the coating should provide a weight gain of 1 to 4% of the total weight of the grain prior to being coated. The coating includes 20 to 50% by weight of an alkali metal azide, preferably sodium azide, 25 to 35% by weight of an inorganic oxidizer, preferably sodium nitrate, 1 to 3% by weight of fumed silicon dioxide, 10 to 15% by weight of a fluoroelastomer such as Viton or Teflon (Du Pont Company), and 15 to 25% by weight of magnesium. Preferably the coating mix includes about 43% by weight of sodium azide, about 28% by weight of sodium nitrate, about 2% by weight of fumed silicon dioxide, about 10% by weight of a fluoroelastomer such as Teflon or Viton, and about 16% by weight of magnesium. The coating is susceptible to detonation when suddenly exposed to pressure above a predetermined pressure of approximately 1,500 psi. When the coating detonates, pressure builds rapidly within the inflator 10 and the possibility of shattering the propellant grains 22, 24 increases.

The gas generated by combustion of the propellant grains 22, 24 flows radially outwardly through a filter 100. The gas then flows radially outwardly through openings 102 in a rigid cylindrical metal tubular housing 104 (FIGS. 1 and 2) which surrounds the propellant grains 22, 24 and filter 100. The filter 100 is preferably made of a plurality of layers of wire mesh, steel wool and fiberglass. The filter 100 prevents sparks and/or particles of hot material from entering the airbag. The inflator 10 will not be described in further detail since it does not form part of the present invention and is disclosed in co-pending U.S. patent application Ser. No. 915,266, filed Oct. 3, 1986, now U.S. Pat. No. 4,817,828 and assigned to the assignee of the present invention.

An igniter 132 is located coaxially within the openings 30 in the end propellant grains 22 at an axial end of the inflator 10. The igniter 132 is cylindrical in shape and is epoxied to a cylindrical inner surface 134 (FIG. 3) of a holder 142. The holder 142 is screwed into a threaded opening in an end plate 144 of the inflator 10. An inertia switch 152 and a vehicle power source 154 are connected in series by wires 162, 164 to the igniter 32. The inertia switch 152 closes in response to deceleration of the vehicle at a rate of deceleration above a predetermined rate, as occurs during a collision of the vehicle. When the inertia switch 152 closes, the power source 154 is electrically connected with the igniter 132. Thus, upon the occurrence of a collision, the inertia switch 152 closes to fire the igniter 132 to ignite the propellant grains 22, 24.

The igniter 132 (FIG. 2) includes a housing 172 (FIG. 2). A bridgewire 182 is located within the housing 172 of the igniter 132 and is electrically connected to the wires 162, 164. The bridgewire 182 is located axially adjacent bridgewire mix 184. The bridgewire mix 184 is preferably from 5 to 40 milligrams of zirconium potassium perchlorate.

Ignitable material 192 is also located within the housing 172 of the igniter 132 and is axially adjacent the bridgewire mix 184. The ignitable material 192 comprises a booster material 194 and an auto-ignition material 196 which ignites when heated to a temperature between 300° F. to 400° F. The ignitable material 192 is preferably a homogeneous mixture of the booster material 194 and the auto-ignition material 196. The ratio by weight of the booster material 194 to the auto-ignition material 196 is preferably between 1.25 to 1 and 30 to 1. By way of example, 250 milligrams to 1.5 grams of booster material may be used and 50 to 200 milligrams of auto-ignition material may be used.

The booster material 194 is preferably one-half gram of a homogeneous mixture of between 50 to 72% by weight of $BKNO_3$ (boron potassium nitrate) and 28 to 50% by weight of a homogeneous mixture of $TiH_2$ (titanium hydride) and KClO$_4$ (potassium perchlorate). The BKNO$_3$ consists of a mixture of between 22% to 26% by weight of boron, 69% to 73% by weight of potassium nitrate and 2% to 6% by weight of a binder, such as Viton. The mixture of TiH$_2$ and KClO$_4$ consists of 27% to 31% by weight of TiH$_2$, 65% to 69% by weight of KClO$_4$ and between 2% to 6% by weight of a binder such as Viton. The booster material 194 ignites when heated to approximately 700° F.

When the electrical current of a predetermined magnitude is applied to the bridgewire, the bridgewire 182 is rapidly heated to ignite the bridgewire mix 184. The heat generated by the ignition of the bridgewire mix 184 ignites the ignitable material 192. Hot gasses and flame from combustion of the ignitable material 192 develop under increasing pressure within the housing 172.

The housing 172 is preferably made of a metal, such as stainless steel. The housing 172 is formed using a deep drawing operation. During the deep drawing operation, four longitudinally extending weakened areas 202 (FIGS. 2 and 3) are formed in the housing 172 by a suitably designed drawing tool (not shown) and are equally spaced about the outer circumference of the housing. The housing 172 includes a relatively thick, closed axial end 212 (FIG. 2) which is formed during the deep drawing operation. The housing 172 also has an open end 214 through which the ignitable material 192, bridgewire mix 184 and bridgewire 182 are inserted during assembly of the igniter 132. The open end 214 of the housing 172 is hermetically sealed by a cap 222 epoxied to the housing.

Each of the weakened areas 202 comprises a longitudinally extending groove 232. The average minimum wall thickness R of the majority of the housing 172 is preferably at least 0.010 of an inch after the deep drawing operation. The tool forming each groove 232 during the deep drawing operation removes some of the material from the outer circumference of the housing 172 so that the weakened area 202 of the housing exists radially inward of the groove 232. The weakened area 202 preferably has a wall thickness T less than 0.005 inch, more preferably between 0.001 inch and 0.003 inch and preferably is 0.002 of an inch. The width W (FIG. 3) of the groove 232, measured along the circumference of the housing is between 0.010–0.030 of an inch and preferably is 0.020 of an inch.

When the pressure developed within the housing 172, by combustion of the ignitable material 192, increases to a pressure of preferably less than 1000 psi, more preferably between 750 to 800 psi, the weakened areas 202 no longer have the strength to contain the pressure and the weakened areas 202 rupture as illustrated in FIG. 4. The hot gases and flame flow under pressure radially outwardly of the longitudinal central axis A of the igniter 132 from newly formed longitudinally extending openings 242 in the housing 172. The hot gases and flame contact inner cylindrical surfaces defining the central openings 30 in the end propellant grains 22 to ignite the coating on the propellant grains. The remainder of the housing 172 remains unruptured and does not deform to any appreciable extent.

The pressure at which the weakened areas 202 in the housing 172 rupture is considerably less than the 1500 psi at which known igniters rupture. As previously discussed, the 1,500 psi pressure may cause the propellant grains 22, 24 to shatter or the ignition-enhancing coating to detonate. Furthermore, by directing the hot gases, flame and pressure radially over a relatively large surface area of the propellant grains 22 instead of axially against a relatively concentrated area of the propellant grains 24 as in the known igniters, there is less chance that the propellant grains will shatter. If any shattering does take place, it is limited to the end propellant grains 22. The end propellant grains 22 comprise a relatively small proportion of the total number of propellant grains 22 and 24. Thus, if the end grains 22 shatter, the total overall performance of the inflator 10 is not affected to any large extent.

An alternate embodiment of the present invention is illustrated in FIG. 5 as an igniter 306. The igniter 306 includes a housing 312. The igniter 306 is similar to the igniter 132 described above and illustrated in FIGS. 1-4. The housing 312 is made from a substantially round tubular cannister with a closed end as described above. Ignitable material 322 is located within the housing. The ignitable material 322 is identical to the ignitable material 192 described above. The housing 312 is preferably made of a metal, such as stainless steel. The housing 312 is formed during a deep drawing operation. During the deep drawing operation, three longitudinally extending grooves 362 are formed in the housing 312 by a suitably designed drawing tool (not shown) and are spaced apart at approximately 5° arcuate increments (shown exaggerated).

The igniter 306 is modified so the three longitudinally extending grooves 362 are concentrated in an arcuate region of the peripheral side surface of the housing 312. The average minimum wall thickness R1 of the majority of the housing 312 is preferably at least 0.010 of an inch after the deep drawing operation. The tool forming each groove 362 removes some of the material from the outer circumference of the housing 312 so that a weakened area 372 of the housing exists radially inwardly of the groove 362. The weakened area 372 preferably has a wall thickness T1 in the range of 0.001 inch and 0.003 inch and is preferably 0.002 inch. The width W1 of each groove 362, measured along the circumference of the housing 312 is between 0.010–0.030 of an inch and preferably is 0.020 of an inch.

When the pressure developed within the housing 312, due to combustion of the ignitable material 322, increases to a pressure of preferably between 750 to 800 psi, the weakened areas 372 of the housing no longer have sufficient strength to contain the pressure. Each weakened area 372 ruptures as described above and illustrated in FIG. 4. The hot gases and flame flow under pressure radially outwardly of the longitudinal central axis of the igniter 306. The hot gases and flame are directed radially outwardly but in an arcuate concentrated area. Thus, the igniter 306 would generally be used when concentrated flow of the hot gases and flame is required. Such an igniter 306 would be used, for example, when the igniter is not located coaxially within the propellant grains, as illustrated in FIG. 1.

From the above description of preferred embodiments of the invention, those skilled in the art will perceive improvements, changes and modifications. Such improvements, changes and modifications within the skill of the art are intended to be covered by the appended claims.

Having described preferred embodiments of the invention, I claim:

1. An apparatus for igniting a gas generating propellant grain which shatters when suddenly exposed to pressure above a shattering level greater than approximately 1500 psi, said apparatus comprising:

a housing having a longitudinal axis, a closed axial end wall, and a closed peripheral side wall;

an ignitable material contained in said housing, said ignitable material developing hot gases, flame and pressure within said housing upon combustion of said ignitable material; and means for containing said hot gases, said flame and said pressure within said housing until said pressure reaches a rupturing level equal to approximately 750-800 psi, and for permitting said side wall of said housing to rupture when said pressure reaches said rupturing level to direct said hot gases and said flame radially out of said housing through said side wall to ignite said propellant grain.

2. The apparatus set forth in claim 1 wherein said means for permitting said side wall of said housing to rupture comprises a weakened rupture area which is located in a groove formed in said peripheral side wall and which ruptures when said pressure within said housing increases to said rupturing level.

3. The apparatus as set forth in claim 2 wherein said peripheral side wall of said housing has a first wall thickness at said rupture area and a second wall thickness outside of said rupture area, said first wall thickness being less than half of said second wall thickness.

4. The apparatus as set forth in claim 3 wherein said housing is made of metal, said second wall thickness is at least 0.010 of an inch, and said first wall thickness is between 0.001 of an inch and 0.003 of an inch.

5. The apparatus set forth in claim 1 further including means for igniting said ignitable material in response to deceleration of a vehicle at a rate above a predetermined rate of deceleration.

6. An apparatus for igniting a gas generating propellant grain which has a surface defining an opening and which is susceptible to fracturing when suddenly exposed to pressure above a predetermined pressure, said apparatus comprising:

a housing extending within said opening in said propellant grain, said housing including an axial end surface and peripheral side surface located adjacent to said surface defining said opening;

an ignitable material contained in said housing for developing hot gases, flame and pressure upon combustion of said ignitable material; and means for permitting said peripheral side surface of said housing to rupture at a pressure substantially less than said predetermined pressure and for directing said hot gases and said flame toward said surface defining said opening to ignite said propellant grain.

7. The apparatus set forth in claim 6 wherein said means for permitting said peripheral side surface of said housing to rupture comprises a weakened area located in said peripheral side surface of said housing which ruptures when the pressure within said housing increases to the rupture pressure which is substantially less than the predetermined pressure.

8. The apparatus as set forth in claim 7 wherein said housing is cylindrical and elongate and has a general wall thickness, and said weakened area is defined by a plurality of longitudinally extending grooves formed in an exterior surface of said peripheral side surface of said housing, a portion of said housing located radially inwardly of each of said plurality of grooves having a wall thickness less than half of said general wall thickness.

9. The apparatus as set forth in claim 8 wherein said housing is made of metal, said general wall thickness is at least 0.010 of an inch, and the portion of said housing located radially inwardly of each of said plurality of grooves has a wall thickness of between 0.001 of an inch and 0.003 of an inch.

10. The apparatus set forth in claim 8 wherein said plurality of grooves are equally spaced about said peripheral side surface of said housing.

11. The apparatus set forth in claim 6 wherein said weakened area ruptures in response to said pressure within said housing increasing to a pressure less than 800 psi.

12. The apparatus set forth in claim 6 further including means for igniting said ignitable material in response to deceleration of a vehicle at a rate above a predetermined rate of deceleration.

13. An apparatus for igniting a gas generating propellant grain for use in an airbag inflator for a vehicle, which propellant grain is susceptible to shattering when suddenly exposed to a pressure above a predetermined pressure, said apparatus comprising:

a housing including an axial end surface, a peripheral side surface and a longitudinal central axis;

an ignitable material contained in said housing, said ignitable material developing hot gases, flame and pressure within said housing upon combustion of said ignitable material;

means for igniting said ignitable material in response to deceleration of said vehicle at a rate above a predetermined rate; and means for permitting said peripheral side surface of said housing to rupture in response to pressure within said housing increasing to a pressure which is substantially less than the predetermined pressure at which the propellant grain shatters and for directing said hot gases and said flame radially of said longitudinal central axis of said housing to ignite the propellant grain.

14. The apparatus set forth in claim 13 wherein said means for permitting said peripheral side surface of said housing to rupture comprises a weakened area located in said peripheral side surface of said housing.

15. The apparatus set forth in claim 14 wherein said housing is cylindrical and elongate and has a general wall thickness, and said weakened area in said housing is defined by a longitudinally extending groove formed in an exterior surface of said peripheral side surface of said housing, a portion of said housing located radially inwardly of said groove having a wall thickness less than half said general wall thickness.

16. The apparatus as set forth in claim 15 wherein said housing is made of metal, said general wall thickness is at least 0.010 of an inch, and said portion of said housing located radially inwardly of said groove has a wall thickness between 0.001 of an inch and 0.003 of an inch.

17. The apparatus set forth in claim 14 wherein said weakened area ruptures in response to said pressure within said housing increasing to a pressure less than 800 psi.

18. An apparatus for igniting an ignition-enhancing coating on a gas generating propellant grain, which coating detonates when suddenly exposed to pressure above a predetermined pressure, said apparatus comprising:

a housing;

an ignitable material contained in said housing, said ignitable material developing hot gases, flame and pressure within said housing upon combustion of said ignitable material, means for initiating combustion of said ignitable material; and means for permitting said housing to rupture in response to the pressure within said housing increasing to a rupture pressure which is substantially less than the predetermined pressure at which said coating detonates to enable the hot gases and flame to contact said coating to ignite said coating to burn at a rate less than detonation, wherein said means for permitting said housing to rupture comprises a weakened area located in said housing which ruptures when the pressure within said housing increases to a pressure less than 1,000 psi.

19. An apparatus for initiating combustion of a plurality of propellant grains, each of said propellant grains being susceptible to shattering when suddenly exposed to pressure above a predetermined pressure, said apparatus comprising:

a housing located adjacent one of said propellant grains, said one propellant grain surrounding said housing;

an ignitable material contained in said housing for developing hot gases, flame and pressure within said housing upon combustion of said ignitable material;

means for initiating combustion of said ignitable material located within said housing; and means for permitting said housing to rupture in response to pressure within said housing increasing to a pressure substantially lower than the predetermined pressure at which the propellant grains shatter and for directing said hot gases and said flame toward said one propellant grain to ignite said one propellant grain and to prevent the others of said propellant grains from being suddenly exposed to the pressure released by the rupturing of said housing.

20. The apparatus set forth in claim 19 wherein said means for permitting said housing to rupture comprises a weakened area located in said housing which ruptures when the pressure within said housing increases to a pressure less than 1,000 psi.

21. An apparatus for igniting an ignition-enhancing coating on a gas generating propellant grain, which coating detonates when suddenly exposed to pressure above a predetermined pressure, said apparatus comprising:

a housing;

an ignitable material contained in said housing, said ignitable material developing hot gases, flame and pressure within said housing upon combustion of said ignitable material;

means for initiating combustion of said ignitable material;

means for permitting said housing to rupture in response to the pressure within said housing increasing to a pressure which is substantially less than the predetermined pressure at which said coating detonates to enable said hot gases and said flame to contact said coating to ignite said coating to burn at a rate less than detonation;

said means for permitting said housing to rupture comprising a weakened area located in said housing which ruptures when the pressure within said housing increases to a pressure less than 1,000 psi; and, said housing comprising a tubular metal member having a wall thickness of 0.01 inch and said weakened area being defined by a portion of said tubular member having a groove formed therein, said portion having a region located radially inward of said groove with a thickness less than 0.005 inch.

22. A gas generating apparatus for a vehicle air bag system, said apparatus comprising:

a plurality of propellant grains, each propellant grain being susceptible to shattering when suddenly exposed to pressure above a predetermined pressure;

a housing located adjacent one of said propellant grains;

an ignitable material contained in said housing for developing hot gases, flame and pressure within said housing upon combustion of said ignitable material;

means for initiating combustion of said ignitable material;

means for permitting said housing to rupture in response to pressure within said housing increasing to a pressure substantially lower than the predetermined pressure at which the propellant grains shatter and for directing said hot gases and said flame toward said one propellant grain to ignite said one propellant grain and to prevent the others of said propellant grains from being suddenly exposed to the pressure released by the rupturing of said housing;

said means for permitting said housing to rupture comprising a weakened area located in said housing which ruptures when the pressure within said housing increases to a pressure less than 1,000 psi; and said housing comprising a tubular metal member having a wall thickness of 0.001 inch and being located in an opening in said one propellant grain, said weakened area being defined by a portion of said housing having a groove formed therein, said tubular member having a weakened wall thickness radially within said groove of less than 0.005 inch.

23. A gas generating apparatus for a vehicle air bag system, said apparatus comprising:

a gas generating propellant grain having a grain surface which shatters when suddenly exposed to pressure above a shattering level of approximately 1500 psi;

a housing having a longitudinal axis, a closed axial end wall, and a closed peripheral side wall adjacent to said grain surface;

an ignitable material contained in said housing, said ignitable material developing hot gases, flame and pressure within said housing upon ignition of said ignitable material and;

means for containing said hot gases, said flame and said pressure within said housing until said pressure reaches a rupturing level substantially less than said shattering level, and for permitting said side wall of said housing to rupture when said pressure reaches said rupturing level to direct said hot gases and said flame radially out of said housing through said side wall to ignite said propellant grain.

24. The apparatus as set forth in claim 23 wherein said means for permitting said side wall of said housing to rupture comprises a weakened rupture area which is located in a groove formed in said peripheral side wall and which ruptures when said pressure within said housing increases to said rupturing level.

25. A gas generating apparatus for a vehicle air bag system, said apparatus comprising:
- a gas generating propellant grain having a grain surface with a coating which detonates when suddenly exposed to a pressure above a detonation level greater than approximately 1500 psi;
- a housing having a longitudinal axis, a closed axial end wall, and a closed peripheral side wall adjacent to said grain surface;
- an ignitable material contained in said housing, said ignitable developing hot gases, flame and pressure within said housing upon ignition of said ignitable material; and
- means for containing hot gases, said flame and said pressure within said housing until said pressure reaches a rupturing level equal to approximately 750-800 psi, and for permitting said side wall of said housing to rupture when said pressure reaches said rupturing level to direct said hot gases and said flame radially out of said housing through said side wall to ignite said propellant grain.

26. The apparatus as set forth in claim 25 wherein said means for permitting said side wall of said housing to rupture comprises a weakened rupture area which is located in a groove formed in said peripheral side wall and which ruptures when said pressure within said housing increases to said rupturing level.

27. A gas generating apparatus for a vehicle air bag system, said apparatus comprising:
- a gas generating propellant grain having a grain surface with a coating which detonates when suddenly exposed to a pressure above a detonation level of approximately 1500 psi;
- a housing having a longitudinal axis, a closed axial end wall, and a closed peripheral side wall adjacent to said grain surface;
- an ignitable material contained in said housing, said ignitable material developing hot gases, flame and pressure within said housing upon ignition of said ignitable material; and
- means for containing said hot gases, said flame and said pressure within said housing until said pressure reaches a rupturing level substantially less than said detonation level, and for permitting said side wall of said housing to rupture when said pressure reaches said rupturing level to direct said hot gases and said flame radially out of said housing through said side wall to ignite said propellant grain.

28. The apparatus as set forth in claim 27 wherein said means for permitting said side wall of said housing to rupture comprises a weakened rupture area which is located in a groove formed in said peripheral side wall and which ruptures when said pressure within said housing increases to said rupturing level.

* * * * *